US010759936B2

(12) United States Patent
Malet Murillo et al.

(10) Patent No.: US 10,759,936 B2
(45) Date of Patent: Sep. 1, 2020

(54) THERMOPLASTIC ABS COMPOSITION REINFORCED WITH NATURAL FIBRES

(71) Applicant: ELIX POLYMERS, S.L., La Canonja (ES)

(72) Inventors: Ramon Malet Murillo, Sabadell (ES); Marc Perez Fernandez, Tarragona (ES); Ignacio Buezas Sierra, Tarragona (ES); Antonio Prunera Casellas, Vilanova i la Geltru (ES); David Castaneda Garrido, Tarragona (ES)

(73) Assignee: ELIX POLYMERS, S.L., La Canonja (ES)

( * ) Notice: Subject to any disclaimer, the term of this patent is extended or adjusted under 35 U.S.C. 154(b) by 50 days.

(21) Appl. No.: 15/774,650

(22) PCT Filed: Nov. 17, 2016

(86) PCT No.: PCT/EP2016/077991
§ 371 (c)(1),
(2) Date: May 9, 2018

(87) PCT Pub. No.: WO2017/089222
PCT Pub. Date: Jun. 1, 2017

(65) Prior Publication Data
US 2018/0346708 A1 Dec. 6, 2018

(30) Foreign Application Priority Data

Nov. 23, 2015 (EP) .................................... 15382580

(51) Int. Cl.
| C08L 55/02 | (2006.01) |
| C08K 3/22 | (2006.01) |
| C08K 7/02 | (2006.01) |
| C08F 212/10 | (2006.01) |
| C08J 5/04 | (2006.01) |
| B33Y 70/00 | (2020.01) |
| C08K 5/20 | (2006.01) |

(52) U.S. Cl.
CPC ............ *C08L 55/02* (2013.01); *C08F 212/10* (2013.01); *C08J 5/045* (2013.01); *C08K 3/22* (2013.01); *C08K 7/02* (2013.01); *B33Y 70/00* (2014.12); *C08F 2500/21* (2013.01); *C08F 2800/20* (2013.01); *C08K 5/20* (2013.01); *C08K 2003/2241* (2013.01)

(58) Field of Classification Search
CPC ..................... C08K 2003/2241; C08L 55/02
See application file for complete search history.

(56) References Cited

U.S. PATENT DOCUMENTS

| 6,391,965 | B1 * | 5/2002 | Koura | ................. C08F 279/04 525/52 |
| 2009/0181199 | A1 * | 7/2009 | Agarwal | ................. C08L 67/02 428/36.8 |
| 2018/0050495 | A1 * | 2/2018 | Stolyarov | ............. B33Y 70/00 |

FOREIGN PATENT DOCUMENTS

| CN | 102464850 A | 5/2012 |
| CN | 102924940 A | 2/2013 |
| CN | 103788566 A | 5/2014 |
| CN | 104194125 A | 12/2014 |
| DE | 10 2012 005 127 A1 | 9/2013 |
| EP | 2 881 249 A1 | 6/2015 |
| JP | 09-143378 A | 6/1997 |
| JP | 2006-233111 A | 9/2006 |
| WO | 00/63285 A1 | 10/2000 |
| WO | 2009/017387 A2 | 2/2009 |
| WO | 2013/122649 A1 | 8/2013 |

OTHER PUBLICATIONS

European Search Report of EP 15 38 2580 dated May 31, 2016.
International Search Report of PCT/EP2016/077991 dated Dec. 19, 2016 [PCT/ISA/210].

* cited by examiner

*Primary Examiner* — Jeffrey C Mullis
(74) *Attorney, Agent, or Firm* — Sughrue Mion, PLLC

(57) ABSTRACT

The present invention relates to a thermoplastic ABS composition reinforced with natural fibres, which comprises an ABS polymer, natural fibres, a compatibilizing polymer, and processing aids comprising a lubricant and titanium dioxide. It relates also to a moulded article prepared from the thermoplastic composition and to its use in extrusion, injection, compression moulding and 3D printing.

13 Claims, 1 Drawing Sheet

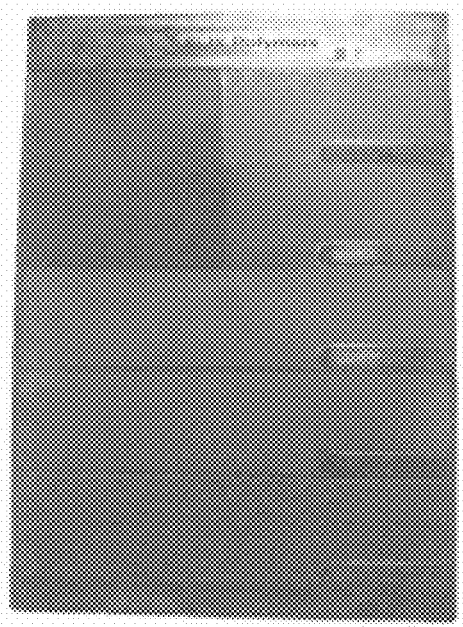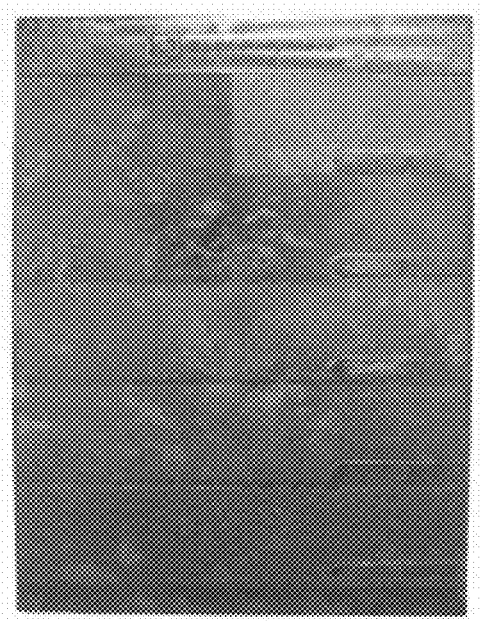
A    B

THERMOPLASTIC ABS COMPOSITION REINFORCED WITH NATURAL FIBRES

CROSS REFERENCE TO RELATED APPLICATIONS

This application is a National Stage of International Application No. PCT/EP2016/077991, filed Nov. 17, 2016, claiming priority based on European Patent Application No. 15382580.7, filed Nov. 23, 2015.

TECHNICAL FIELD

The present invention relates to an acrylonitrile-butadiene-styrene (ABS) copolymer reinforced with natural fibres.

TECHNICAL BACKGROUND

Polymeric composites have been one of the most important materials during the last decades, they have the capacity to replace a lot of conventional materials i.e. metals. The use of natural fibre to make low cost and eco-friendly composite materials is a subject of great importance, particularly; wood fibres have recently attracted the interest of scientists and companies as reinforcement fillers due to its low cost, low density, high specific properties, less reliance on foreign oil sources, recyclability and carbon footprint reduction.

Some of the most common natural fibres are flax, hemp, coir, palm, cellulose, sisal, kenaf, bamboo, jute, wheat straw and wood fibres. However, some drawbacks of natural fibres (i.e. higher polar and hydrophilic) cause poorly compatibility between the natural fibres and the polymeric matrix. The synthetic polymers that are used as the matrix for natural fibres include thermoplastics and thermosets, however over the last decades; these matrices used are shifted from thermosets to thermoplastics.

The automotive industry have been instigated to develop new materials using these inexpensive fillers due to a new European Legislation implemented in 2006 which requires that in 2015 the 85% of the material of the car must be recycled or reused. The main benefit of these materials is the decrease of $CO_2$ produced due to the origin of these materials and their low density and light weight. The weight reduction in the automotive sector decreases petrol consumption.

However, several limitations must be overcome in order to exploit the full potential of natural fibres. Firstly the fibre surface treatment needs to be well developed and implemented. Secondly properties of composites are greatly dependent on the content of fibre, matrix type and composite composition. The quality of fibre matrix interface should be improved for an optimized thermoplastic composition with perfect compatibilization between the natural fibres and the polymeric matrix.

Moreover, these natural-fibre reinforced plastics have some drawbacks, for example, the majority of the articles are used as off-screen structure pieces in interior parts due to its poor surface finish.

In order to improve the compatibility of natural fibres with synthetic polymer various modifications have been described e.g. alkali treatment, hot water treatment, silane treatment or salt water treatment. Those treatments may influence on the overall properties of the reinforced polymer including tensile strength and modulus, and flexural properties.

Aforementioned, natural-fibre reinforced plastics are used in numerous applications, i.e. automotive industry. In the past, the components (composites/plastics/articles/parts) were produced by compression moulding due to technical limitations in processing. Only recently has been possible to produce plastics materials in pellet form that could be processed by injection moulding technology where polypropylene (PP) is the most used matrix material.

In this context, thermoplastics natural fibre—synthetic resin composites based on polypropylene (PP) or polyethylene (PE) homopolymers have been developed in the last years for injection moulding applications due to ecological environment and light weight design, as disclosed in European patent application EP-A-2881249, German patent application DE-A-102012005127, and International patent applications WO-A-00/63285 and WO-A-2009/017387. However some drawbacks have been identified in those technical solutions, which can be associated to a complex injection process, low mechanical properties and poor surface finish to fulfil companies' requirements.

The use of natural fibre reinforced amorphous thermoplastic in particular acrylonitrile-butadiene-styrene (ABS) copolymers is limited.

Chinese patent application CN-A-102464850 relates to a natural fibre-reinforced styrene maleic anhydride copolymer compositions and deals with the poor compatibility of natural fibres. It is disclosed a general composition comprising 10-50 wt. % by weight of styrene-maleic anhydride copolymer, 10-40 wt. % of rubber elastomer, 5-25 wt. % of styrene-acrylonitrile copolymer, 5-40 wt. % of natural fibres, and 0.1-1.5 wt. % of processing aids selected from lubricants, antioxidants, mould release agents, or colouring agents, wherein the molecular weight of the styrene maleic anhydride copolymer is 20,000-300,000, the rubber elastomer is ABS (styrene-butadiene-acrylonitrile terpolymer), among others, and natural fibres are selected from sisal, ramie, flax, hemp, jute or bamboo.

Chinese patent application CN-A-103788566 relates to a plastic imitation of wood, which comprises the following components: 100 parts of ABS or polylactic acid (PLA), 5 to 70 parts of wood flour and 0.5 to 3 of a titanate coupling agent. The process for preparing it includes the treatment of wood flour with the coupling agent before the mixing with the thermoplastic polymer. This composition and process is suitable for preparing objects showing a wood-like texture with surface roughness, but not for smooth surfaces.

Japanese patent application JP-A-H09143378 refers to a thermoplastic resin composition, which comprises 10-98 wt. % of thermoplastic resin and 2-90 wt. % of wood flour having lignin content of 25 wt. % or below. The composition includes also a rubbery polymer, and it can include also a coupling agent and additives, such as a flame retardant, a lubricant, a plasticizer, antioxidants, antistatic agents, antimicrobial agents, foaming agents, silicone oils, and additives such as light resistance (weathering) agent.

Japanese patent application JP-A-2006/233111 refers to a styrenic resin composition, which can be easily extruded to obtain a grain pattern on the extruded object. In Example 1-5 it is disclosed a composition comprising 30 parts of ABS, 50 parts of styrene-acrylonitrile copolymer (SAN), 20 parts of SAN-butyl acrylate copolymer, 1 part of EBS, 1 part of calcium stearate, 1 part of magnesium stearate, 3 parts of PE wax, 1 part of oxidized PE wax, 15 parts of talc, 5 parts of wood flour, and titanium dioxide, among other pigments.

International patent application WO-A-2013/122649 discloses a composite polymer derived from melt processing of a thermoplastic polymeric matrix (45-85 wt. %) with wood pulp fibre (10-50 wt. %), preferably bleached chemical wood pulp fibre, which has a brightness of at least 20. It is disclosed that in the case of using nonpolar polymers, such as olefins, it is used a compatibilizer, typically graft copolymers such as maleic anhydride polypropylene or maleic anhydride polyethylene. To solve the problems associated with the uniform distribution of cellulose pulp fibres in the polymeric matrix, fibres are added to the polymer in a two-step operation process.

Chinese patent application CN-A-102924940 discloses an anti-aging plastic wood composite material prepared by the following raw materials by mass: 20%-35% of plastics, 20%-70% of natural wood fibers, 5%-45% of a fire retardant, 1%-10% of a compatibilizer, 0.1%-3% of a lubricant, 0.5%-3% of a plasticizer, 0.1%-2% of an anti-aging filling material, and 0.5%-3% of a coloring agent. It does not relate to the problem raised by the non-uniform distribution of natural wood fibers in the polymeric matrix.

Chinese patent application CN-A-104194125 discloses magnetic wood-plastic material, which comprises the following ingredients in parts by weight: 0.1-20 parts of rare earth magnetic powder, 0.5-5 parts of pigment, 10-70 parts of wood fibers, 20-85 parts of plastic, 2-5 parts of lubricant and 1-5 parts of compatilizer. It does not relate to the problem raised by the non-uniform distribution of natural wood fibers in the polymeric matrix.

Although different technologies have been developed to obtain articles with improved appearance, this target is not always reached using a single processing stage using natural-fibres reinforced thermoplastics compositions, let alone to produce a reinforced polymer capable of producing a coloured article with good surface appearance in a single stage.

There is, thus, a need to provide a thermoplastic composition, which overcomes the problems of the prior art technical solutions, being prepared by a simpler process, showing balanced mechanical and thermal properties and being suitable for extrusion, injection, and compression moulding as well 3D printing applications, including articles requiring excellent surface appearance.

OBJECT OF THE INVENTION

The object of the present invention is a thermoplastic composition. It is also an object of the present invention a moulded article prepared from that thermoplastic composition.

It is also an object of the present invention the use of the thermoplastic composition in extrusion, injection, compression moulding and 3D printing.

BRIEF DESCRIPTION OF THE DRAWING

FIGURE

The FIGURE illustrates the surface appearance of the thermoplastic composition of the invention prepared according to Example 2 in comparison to the surface appearance of the thermoplastic composition prepared according to Comparative example, which does not contain titanium dioxide.

DETAILED DESCRIPTION OF THE INVENTION

The object of the present invention is a thermoplastic composition comprising:
1) an acrylonitrile-butadiene-styrene (ABS) polymer,
2) natural fibres,
3) a compatibilizing polymer, and
4) processing aids comprising a lubricant and titanium dioxide, wherein the amount of titanium dioxide is comprised from 1 to 10 wt. %.

In the description, the components of the thermoplastic composition are referred as shown in Table I:

TABLE I

| Component | Definition |
| --- | --- |
| A | Acrylonitrile-butadiene-styrene (ABS) polymer |
| B | Natural fibres |
| C | Compatibilizing polymer |
| D | Lubricant |
| E | Titanium dioxide |

The authors of the present invention have developed a thermoplastic composition showing an optimized impact resistance/flow ability ratio, which is obtained by a simple process, easy to implement industrially. The composition shows well-balanced mechanical and thermal properties, it is environmentally friendly and can be used in a wide range of applications, such as extrusion, injection, compression moulding and 3D printing. Surprisingly, the moulded articles obtained from the thermoplastic composition show a uniform distribution of the natural fibre and an elegant surface appearance.

In the present description as well as in the claims, the singular forms "a" and "an" include also the plural reference unless the context clearly indicates otherwise.

In the present description the specified parts are always parts by weight and the specified % values are always wt. % unless otherwise stated. The sum of the percentages of the components in the thermoplastic composition of the invention are 100 wt. %. In the context of the present invention percentages have ±10% of margin. In the context of the present invention the term "about" means ±10%.

The glass transition temperature (Tg) of compounds disclosed in this description is determined using standard methods and devices, such as the differential scanning calorimeter (DSC) performed on a DSC/TGA STARe (mettler-toledo). Standard parameters are applied on a sample mass of for example about 60 mg. Standard conditions are for example the temperature program between 35° C. and 220° C., two times heating and one cooling, both at a rate of 10° C./min and an air flow of 20 ml/min; or the temperature program between −130° C. and 200° C., two times heating and one cooling, both at a rate of 20° C./min and an nitrogen flow of 50 ml/min.

ABS Polymer

The thermoplastic composition of the invention comprises an acrylonitrile-butadiene-styrene (ABS) polymer (Component A).

The ABS polymer is a well-known polymer comprising acrylonitrile, butadiene and styrene as monomers. In the present invention, the expression ABS is used in the generic sense and includes known equivalents for acrylonitrile, such as methacrylonitrile and propacrylonitrile, among others; for butadiene, such as isoprene, and chloroprene, among others, and for styrene such as α-methyl styrene and halostyrene, among others.

Usually component A comprises at least one grafted ABS polymer, with a glass transition temperature Tg<0° C., (Component A1). In a preferred embodiment it comprises additionally at least one rubber-free copolymer (Component A2).

The amounts of components A1 and optionally A2 are given in wt. %. Generally in the thermoplastic composition of the invention the amount of ABS polymer is comprised from 40 to 90 wt. %, preferably from 50 to 80 wt. %, and more preferably from 60 to 75 wt. %.

In the thermoplastic composition of the invention the content of grafted ABS polymer is generally comprised from 15 to 70 wt. %, preferably from 18 to 50 wt. %, and more preferably from 20 to 35 wt. %; and the content of rubber-free polymer, if present, is comprised from 25 to 65 wt. %, preferably from 30 to 60 wt. %, and more preferably from 35 to 50 wt. %.

The determination of the average molecular weight Mw of component A2 is carried out by using standard methods well known by the skilled person, for example, using Gel Permeation Chromatography (GPC), with tetrahydrofuran as solvent, polystyrene as standard polymer, and detection by refractive index.

Grafted ABS polymer

The grafted ABS polymer can be obtained by either by bulk polymerization or by emulsion polymerization. Preferably it is obtained by emulsion polymerization. Methods for preparing grafted ABS polymer by emulsion polymerization are disclosed, for example, in EP-A-0436381 and EP-A-0522710. Methods for preparing grafted ABS polymer by bulk polymerization are disclosed, for example, in EP-A-0810242.

In a preferred embodiment the grafted ABS is obtainable by bulk polymerization process containing at least 50 parts of a grafted vinyl aromatic compound and vinyl cyanide compound in a weight ratio of 90:10 to 50:50, preferably styrene and acrylonitrile, in the presence of from 3 to 50 parts of a butadiene polymer. Preferably a butadiene polymer containing an average particle diameter $d_{50}$ from 100 to 10000 nm, preferably 200 to 5000 nm, more preferably 400 to 2000 nm. In a preferred embodiment, the butadiene rubber content is comprised from 3 to 50 wt. %, more preferably from 5 to 30 wt. %, and yet more preferably from 6 to 25 wt. %.

In a preferred embodiment the grafted ABS is obtainable by emulsion polymerization process containing at least 25 parts of a grafted vinyl aromatic compound and vinyl cyanide compound in a weight ratio of 90:10 to 50:50, preferably styrene and acrylonitrile, in the presence of not more than 75 parts a butadiene polymer. Preferably a mono, bi-, tri- or multimodal butadiene polymer containing particle populations showing an average particle diameter $d_{50}$ from 50 to 600 nm with a butadiene rubber containing from 35 to 97 (wt. %)$^{-1}$ of gel content determined using, for example, Time-Domain NMR devices, such as Minispec mq20 NMR—Polymer Research System (Bruker).

In a preferred embodiment the grafted ABS is obtainable by emulsion polymerization process containing at least 40 parts, preferably from 40 to 48, more preferably from 42 to 48, of a grafted vinyl aromatic compound and vinyl cyanide compound in a weight ratio of 90:10 to 50:50, preferably styrene and acrylonitrile, in the presence of at least 50 parts, preferably from 52 to 60, more preferably 52 to 58, of a butadiene polymer. Preferably a mono-, bi-, tri- or multimodal butadiene polymer containing particle populations showing an average particle diameter $d_{50}$ selected from 50 to 200 nm, preferably from 65 to 150 nm, more preferably from 120 to 130 nm; from 220 to 340 nm, preferably from 240 to 320 nm, more preferably from 260 to 300; and from 340 nm to 480 nm, preferably from 350 to 450 nm, more preferably from 360 to 420. In a preferred embodiment, the butadiene rubber contains 35 to 97 (wt. %)$^{-1}$ of gel content.

In another embodiment, the grafted ABS is a polymer wherein styrene is replaced wholly or partially by α-methyl styrene, maleic anhydride, methyl methacrylate or N-phenyl maleimide.

In another embodiment, the grafted ABS is a polymer, which further comprises small amounts, 1 wt. % to 10 wt. %, of (meth)acrylate linear or branched $C_2$-$C_8$ alkyl esters, such as ethyl (meth)acrylate, propyl (meth)acrylate, butyl (meth)acrylate, or 2-ethylhexyl (meth)acrylate.

Grafted ABS are available commercially, for example, through the companies ELIX polymers and Korea Kumho Petrochemical: Grafted ABS polymer produced by emulsion polymerization with a butadiene content comprised between 51 and 54 wt. % commercially available under the trade name ELIX 152I (ELIX Polymers); Grafted ABS polymer produced by emulsion polymerization with a butadiene content comprised between 54 and 58 wt. % commercially available under the trade name ELIX 158I (ELIX Polymers); Mono-modal grafted ABS polymer produced by emulsion polymerization with a butadiene content comprised between 50 and 60 wt. % commercially available under the trade name KUMHO® HR181 (Korea Kumho Petrochemical); grafted ABS produced by bulk polymerization is commercially available under the trade name MAGNUM® 3504 (Trinseo).

Rubber-Free Copolymer

The optional rubber-free copolymer is generally comprised of styrene and acrylonitrile in a weight ratio of from 90:10 to 50:50, preferably from 90:10 to 60:40, and more preferably from 90:10 to 70:30, the styrene being able to be replaced wholly or partially by α-methyl styrene, maleic anhydride or N-phenylmaleimide. Preferably the rubber-free copolymer comprises styrene and acrylonitrile as monomers, more preferably in a ratio of 70:30 to 80:20, and yet more preferably 73:27.

In a preferred embodiment the rubber-free component forms a hard phase with a glass transition temperature Tg of at least 20° C.

In a preferred embodiment the rubber-free copolymer has a molecular weight comprised from 20,000 to 300,000 Da; preferably from 100,000 to 200,000 Da; and more preferably from 100,000 to 145,000 Da.

Rubber-free polymers are available commercially, for example, through the company ELIX polymers: SAN polymer showing a molecular weight of about 105,000 Da, wherein the styrene:acrylonitrile ratio is 73:27, commercially available under the trade name ELIX 230G (ELIX Polymers); SAN molecular weight of about 140,000, wherein the styrene:acrylonitrile=73:27, commercially available under the trade name ELIX 260G (ELIX Polymers); SAN molecular weight of about 165,000, wherein the styrene:acrylonitrile=73:27, commercially available under the trade name ELIX 280G (ELIX Polymers).

Natural Fibres

The thermoplastic composition of the invention comprises natural fibres (Component B)

Natural fibres are selected from flax, hemp, palm, cellulose, sisal, kenaf, bamboo, jute, sisal, wheat straw, wood fibres, and mixtures thereof.

Preferably natural fibres are cellulose based natural fibres or wood fibres, more preferably wood fibres; yet more preferably refined wood fibres; even more preferably thermo-mechanically treated wood fibres.

In a preferred embodiment a major fraction of the natural fibres have an aspect ratio of at least 10:1, more preferably at least 20:1, and yet more preferably at least 25:1.

In a preferred embodiment a minimum of 98 wt. % of the natural fibres shows an average length of >200 μm and a maximum of moisture content of 7%.

Thermo-mechanically treated wood fibres can be obtained as disclosed in International patent applications WO-A-2006/001717 or WO-A-2011/002314. They can also be obtained commercially under the trade name Woodforce® Natural FAST and Woodforce® Natural Standard in natural colour, or in black colour as Woodforce® Black FAST and Woodforce® Black Standard (Sonae Industria).

Generally the amount of natural fibres in the thermoplastic composition is below 40 wt. %, preferably it is comprised from 5 to 37 wt. %, more preferably from 10 to 35 wt. %, more preferably from 15 to 33 wt. %, and yet more preferably from 18 to 30 wt. %.

Compatibilizing Polymer

The thermoplastic composition of the invention includes a compatibilizing polymer (Component C), which is a polymer with a reactive group. The reactive group is preferably an epoxy group, N-phenylmaleimide(N-PMI) group and maleic anhydride (MAH) group. Any compatibilizer having these reactive groups may be used without limitation in the present invention. The compatibilizer is preferably a polymer, which includes any of the following monomers glycidyl methacrylate, maleic anhydride, N-phenylmaleimide, and mixtures thereof in combination with styrene or α-methylstyrene. More preferably the compatibilizer is a copolymer of styrene and maleic anhydride (SMA) or a copolymer of styrene, maleic anhydride and N-phenylmaleimide (SMI); yet more preferably it is a copolymer of styrene and maleic anhydride (SMA).

Generally the molecular weight of the styrene maleic anhydride copolymer (SMA) is 20,000-300,000 Da, wherein the content of MAH is below 50 wt. %; preferably it is 50,000-180,000 Da with MAH content preferably from 15 wt. % to 35 wt. %.

Generally the molecular weight of the styrene, maleic anhydride and N-phenylmaleimide copolymer (SMI) is 20,000-300,000 Da, wherein the content of MAH is below 30 wt. % and the content of N-PMI is below 55 wt. %; preferably a molecular weight 90,000-200,000 Da with the content of MAH preferably from 1 wt. % to 25 wt. % and the N-PMI content preferably from 10 wt. % to 55 wt. %. and more preferably from 10 wt. % to 35 wt. %.

The polymeric compatibilizers are commercially available. Suitable compatibilizers are, for example, SMA polymer showing a molecular weight of about 110,000, MAH content of 23 wt. %, commercially available under the trade name XIRAN® SZ23110 (Polyscope Polymers), SMA polymer showing a molecular weight of about 120,000, MAH content of 26 wt. %, commercially available under the trade name XIRAN® SZ26120 (Polyscope Polymers), SMI polymer showing a molecular weight of about 145,000, MAH content of 10 wt. %, N-PMI content of 18 wt. %, commercially available under the trade name XIRAN® IZ1018M (Polyscope Polymers), SMI polymer showing a molecular weight of about 150,000, MAH content of 7 wt. %, N-PMI content of 21 wt. %, commercially available under the trade name XIRAN® 0721M (Polyscope Polymers).

Generally the amount of compatibilizing polymer in the thermoplastic composition is from 1 to 10 wt. %, preferably it is comprised from 2 to 8 wt. %, and more preferably from 2 to 5 wt %.

Processing Aids

The thermoplastic composition of the invention comprises a lubricant (Component D) and titanium dioxide (Component E) as processing aids.

The lubricant includes stearates, paraffin oils, polyethylene waxes, lauric acid, palmitic acid, stearic acid, stearic acid amides, ethylenediamine, glycerol, and mixtures thereof; preferably it is ethylene bis stearamide (EBS), pentaerythritol tetrastearate (PETS), paraffin oils, stearic acid, glycerol monostearate, stearyl stearate, butyl strearate, polyethylene waxes, or mixtures thereof; more preferably it is ethylene bis stearamide (EBS).

In a preferred embodiment, the processing aid consists of a lubricant and titanium dioxide. In a more preferred embodiment the processing aid consists of a combination of ethylene bis stearamide (EBS) and titanium dioxide.

Generally the amount of lubricant in the thermoplastic composition is from 1 to 5 wt. %, preferably it is comprised from 1.5 to 3.5 wt. %, and more preferably from 1.8 to 2.5 wt.

The amount of titanium dioxide in the thermoplastic composition of the invention is comprised from 1 to 10 wt. %, preferably from 1.5 to 7 wt. %, more preferably from 2 to 5 wt. %.

As shown in Comparative example, the use of the moulding compositions of the prior art not including a specific amount of titanium dioxide produces moulded parts with bad surface finishes, in particular, flow lines described as visible marks on the moulded articles surfaces that indicate the direction of the flow of the melt into the mould and wavy surface appearances caused by improper flow of the melt into the mould due to unavoidable difference between melt flow of the composite. The use of a specific amount of titanium dioxide in the thermoplastic composition of the invention surprisingly accomplishes the uniform distribution of the natural fibres in the polymeric matrix and prevents the formation of flow marks improving the surface appearance of the articles, avoiding additional surface treatments of the object.

The colouring of thermoplastic compositions is being used for article design since it is excellent in colour properties. In this context, the use of titanium dioxide pigment produced also an excellent pre-coloured matrix base natural fibre reinforced thermoplastic with high deep colour shade. This pre-coloured matrix base can be used with other pigments or dyes for new colour development, even not only for a single colour tone, to obtain good aesthetics surface finish moulded parts in natural-fibres reinforced ABS thermoplastics compositions, in a single stage.

Additives

The necessary or advantageous additives, for example, antioxidants, mould releasing agents, pigments, visible light stabilizers, UV stabilizers, blowing agents, foaming additives, antistatic agents, antiblocking agents, heat stabilizers, impact modifiers, plasticizers, biocides, flame retardants, tackifiers, colorants, pigments, mineral fillers, and mixtures thereof, can be added to the thermoplastic compositions during their preparation, further processing, working up and final forming.

In a preferred embodiment, the thermoplastic composition comprises antioxidants, antistatic agents, mould releasing agents, colorants, pigments, mineral fillers, visible light and UV stabilizers, and mixtures thereof.

Said antioxidants include, for example, phosphorus-based antioxidants (i.e. phosphites), phenol-based antioxidants, thioesters, and hindered phenolic anti-oxygen scavengers.

Said antistatic agents include, for example, cationic compounds (quaternary ammonium, phosphonium or sulfonium salts), anionic compounds (alkylsulfonates, alkyl sulfates, alkyl phosphates, carboxylates in the form of alkali or alkaline earth metal salts), non-ionic compounds (polyethylene glycol esters, polyethylene glycol ethers, fatty acid esters, ethoxylated fatty amines) and polyol derivatives; preferably they are non-ionic compounds, more preferably they are selected from polyethylene glycol esters, polyethylene glycol ethers, fatty acid esters, polyalkylene ethers, ethoxylated fatty amines and polyol derivatives, and yet more preferably they are polyethylene ethers.

Said UV stabilizers include, for example, benzotriazoles and Hindered Amine Light Stabilizer (HALS).

Said mould release agents include, for example, silicone-based release agents magnesium stearates, calcium stearates, zinc stearate and magnesium oxides; preferably they are magnesium stearates, magnesium oxides, silicone-based release agents or mixtures thereof, more preferably they are silicone-based release agent, magnesium stearate, or mixtures thereof, and yet more preferably they are a combination of magnesium stearate and a silicone based release agent.

Those additives are well known by the skilled person and are available commercially. Light stabilizers and antioxidants are offered under, for example, the trade names IRGANOX®, IRGAFOS®, TINUVIN® (BASF). Releasing agents are available, for example, under the tradenames KEMILUB® (UNDESA) and WACKER® AK (Wacker).

The thermoplastic composition of the invention can include further colorants, pigments and mineral fillers to obtain coloured articles. It can be included, for example, carbon black, calcium carbonate, iron oxides, or mixtures thereof. Generally the amount of colorant or pigments is comprised from 0.1 to 5 wt. %, preferably from 0.5 to 4 wt. %, and more preferably 1 to 3 wt. %.

Process for Preparing the Thermoplastic Composition

The process for preparing the thermoplastic composition of the invention is simple and can be carried out in standard industrial equipment, such as screw machine for extrusion granulation. For example, that process can include, for example, the mixing of the components in a high speed mixer for a period of time enough to get a homogeneous distribution, e.g. 1-10 min, then the mixture is fed in a screw machine at a speed between 100 and 400 rpm, maintaining the melt temperature below about 200° C. to avoid fibre degradation. The compounding step is generally carried out at a temperature comprised between 170 and 210° C.

Processing of the Thermoplastic Composition

The processing of the thermoplastic composition can be carried out using conventional processing equipment and includes, for example, processing by injection moulding, sheet extrusion with subsequent thermoforming, calendaring and 3D printing.

The injection process using the thermoplastic composition of the invention can achieve a temperature of about 220° C. using high speed and pressure. Under such circumstances, no product degradation is shown. It forms also part of the object of the present invention a moulded article prepared from the thermoplastic composition of the invention.

It forms also part of the object of the present invention the use of the thermoplastic composition of the invention in extrusion, injection, compression moulding and 3D printing.

The thermoplastic composition of the invention shows the following advantages.

It has well-balanced mechanical and thermal properties as shown in Example 10, which provide capacity to be processed and used in a wide range of applications. This balance between high stiffness and heat resistance with an optimized impact resistance/flow ability ratio that makes it suitable to be used in different processing methods such as extrusion and injection.

Surprisingly, articles obtained from the thermoplastic composition in a single stage process show an improved homogeneity of the distribution of the fibre giving better technical performance in terms of mechanical and thermal properties and the use of a specific amount of titanium dioxide allowed an improvement of the surface appearance in comparison to other natural fibre reinforced composites. The improvement of the surface appearance extends its application to objects that remain visible in the final use, without needing any further surface treatment.

The use of natural fibres in thermoplastic compositions is gaining preference over glass fibres and carbon filler due to their low cost and low-weigh characteristics.

The thermoplastic composition is suitable to be used in injection moulding applications; additionally, it can be used on complex moulds and even for thin walled parts.

The thermoplastic composition of the invention is suitable for use in 3-D printing applications with homogenous distribution of the natural fibre over the whole polymer and obtaining articles with excellent surface appearance as shown in the FIGURE.

The thermoplastic composition is suitable to incorporate different pigments in order to obtain a coloured article with an excellent surface finishing without the need of any additional surface treatment.

The invention comprises the following embodiments:

1.—Thermoplastic composition comprising:
 1) an acrylonitrile-butadiene-styrene (ABS) polymer,
 2) natural fibres,
 3) a compatibilizing polymer, and
 4) processing aids comprising a lubricant and titanium dioxide, wherein the amount of titanium dioxide is comprised from 1 to 10 wt. %.

2.—Thermoplastic composition according to embodiment 1, wherein the amount of ABS polymer is comprised from 40 to 90 wt. %.

3.—Thermoplastic composition according to embodiment 1, wherein the ABS polymer comprises at least one grafted ABS polymer, with a glass transition temperature Tg<0° C.

4.—Thermoplastic composition according to embodiment 3, wherein the content of grafted ABS polymer is comprised from 15 to 70 wt. %.

5.—Thermoplastic composition according to embodiment 3, wherein it comprises additionally at least one rubber-free copolymer.

6.—Thermoplastic composition according to embodiment 5, wherein the content of rubber-free polymer is comprised from 25 to 65 wt. %.

7.—Thermoplastic composition according to any one of embodiments 3 to 6, wherein the grafted ABS is obtainable by bulk polymerization process containing at least 50 parts of a grafted vinyl aromatic compound and vinyl cyanide compound in a weight ratio of 90:10 to 50:50, preferably styrene and acrylonitrile, in the presence of from 3 to 50 parts of a butadiene polymer.

8.—Thermoplastic composition according to any one of embodiments 3 to 6, wherein the grafted ABS is obtainable by emulsion polymerization process containing at least 25 parts of a grafted vinyl aromatic compound and vinyl cyanide compound in a weight ratio of 90:10 to 50:50, preferably styrene and acrylonitrile, in the presence of not more than 75 parts a butadiene polymer.

9.—Thermoplastic composition according to embodiment 8, wherein the grafted ABS is obtainable by emulsion polymerization process containing at least 40 parts of a grafted vinyl aromatic compound and vinyl cyanide compound in a weight ratio of 90:10 to 50:50, preferably styrene and acrylonitrile, in the presence of at least 50 parts of a butadiene polymer.

10.—Thermoplastic composition according to embodiment 9, wherein the butadiene polymer contains an average particle diameter $d_{50}$ from 50 to 600 nm.

11.—Thermoplastic composition according to embodiment 10, wherein the butadiene polymer contains particle populations showing an average particle diameter $d_{50}$ selected from 50 to 200 nm; from 220 to 340 nm; and from 340 nm to 480 nm.

12.—Thermoplastic composition according to embodiments 10 or 11, wherein the butadiene polymer contains from 35 to 97 (wt. %)$^{-1}$ of gel.

13.—Thermoplastic composition according to embodiment 5, wherein the rubber-free copolymer is comprised of styrene and acrylonitrile in a weight ratio of from 90:10 to 50:50.

14.—Thermoplastic composition according to embodiment 13, wherein the rubber-free copolymer is comprised of styrene and acrylonitrile in a weight ratio of from 73:27.

15.—Thermoplastic composition according to any of embodiments 1 to 14, wherein the natural fibres are cellulose based natural fibres or wood fibres.

16.—Thermoplastic composition according to embodiment 15, wherein the natural fibres are thermo-mechanically treated wood fibres.

17.—Thermoplastic composition according to any of embodiments 1 to 16, wherein the compatibilizing polymer is a polymer with a reactive group selected from the group consisting of epoxy group, N-phenylmaleimide group and maleic anhydride group.

18.—Thermoplastic composition according to embodiment 17, wherein the compatibilizer is a polymer, which includes any of the following monomers glycidyl methacrylate, maleic anhydride, N-phenylmaleimide, and mixtures thereof in combination with styrene or α-methylstyrene.

19.—Thermoplastic composition according to embodiment 18, wherein the compatibilizer is a copolymer of styrene and maleic anhydride or a copolymer of styrene, maleic anhydride and N-phenylmaleimide.

20.—Thermoplastic composition according to any of embodiments 1 to 19, wherein the amount of compatibilizing polymer in the thermoplastic composition is from 1 to 10 wt. %.

21.—Thermoplastic composition according to any of claims 1 to 20, wherein the lubricant is selected from the group consisting of stearates, paraffin oils, polyethylene waxes, lauric acid, palmitic acid, stearic acid, stearic acid amides, ethylenediamine, glycerol, and mixtures thereof.

22.—Thermoplastic composition according to embodiment 21, wherein the lubricant is ethylene bis stearamide.

23.—Thermoplastic composition according to embodiment 22, wherein the amount of lubricant in the thermoplastic composition is from 1 to 5 wt. %.

24.—Thermoplastic composition according to any of embodiments 1 to 23, wherein it further comprises antioxidants, antistatic agents, mould releasing agents, colorants, pigments, mineral fillers, visible light and UV stabilizers, and mixtures thereof.

25.—Thermoplastic composition according to embodiment 24, wherein it comprises carbon black, calcium carbonate, iron oxides, or mixtures thereof.

26.—A moulded article prepared from the thermoplastic composition of any one of embodiments 1 to 25.

27.—Use of the thermoplastic composition of any one of embodiments 1 to 25 in extrusion, injection, compression moulding and 3D printing.

Next, several examples of the invention are provided for illustrative purposes.

EXAMPLES

Examples 1-8 and Comparative Example: ABS Thermoplastic Compositions

The components listed in the Table 1 were premixed in a high speed in a turbo-mixer for 5 minutes and then placed in a twin screw machine, at 400 rpm of rotational speed of 400 rpm and at a temperature of 200° C., to obtain the thermoplastic composition by extrusion granulation. Amounts in the table are expressed in parts by weight:

TABLE 1

| Component | Example | | | | | | | | |
|---|---|---|---|---|---|---|---|---|---|
| | 1 | 2 | 3 | 4 | 5 | 6 | 7 | 8 | Comp. |
| A.1.1-1 | 27.84 | | 27.84 | 27.84 | 27.84 | 27.84 | 25.73 | | 23.91 |
| A.1.1-2 | | 26.00 | | | | | | | |
| A.1.1-3 | | | | | | | | 23.34 | |
| A.2 | 42.44 | 44.76 | 42.44 | 42.44 | 42.44 | 40.44 | 38.80 | 46.94 | 50.81 |
| B-1 | 22.02 | 22.02 | 22.02 | 22.02 | 22.02 | 22.02 | 22.00 | | |
| B-2 | | | | | | | | 22.02 | 22.02 |
| C-1 | 3 | 3 | | | | 5 | 7.97 | 3 | 3 |
| C-2 | | | 3 | | | | | | |
| C-3 | | | | 3 | | | | | |
| C-4 | | | | | 3 | | | | |
| D | 2 | 1.65 | 2 | 2 | 2 | 2 | 2 | 2 | 2 |
| E | 2.22 | 1.42 | 2.22 | 2.22 | 2.22 | 2.22 | 2.22 | 2.22 | 2.22 |
| Other additives | 0.48 | 1.15 | 0.48 | 0.48 | 0.48 | 0.48 | 1.28 | 0.48 | 0.48 |

The following components were used in the previous examples 1-8:

Component A.1.1-1=Grafted ABS polymer produced by emulsion polymerization with a butadiene content between 51-54 wt. % commercially available under the trade name ELIX 152I (ELIX Polymers).

Component A.1.1-2=Grafted ABS polymer produced by emulsion polymerization with a butadiene content between 54-58 wt. % commercially available under the trade name ELIX 158I (ELIX Polymers).

Component A.1.1-3=Mono-modal grafted ABS polymer produced by emulsion polymerization with a butadiene content between 50-60 wt. % commercially available under the trade name KUMHO® HR181 (Korea Kumho Petrochemical).

Component A.2: SAN polymer showing a molecular weight of 105,000, wherein the styrene:acrylonitrile ratio is 73:27, commercially available under the trade name ELIX 230G (ELIX Polymers).

Component B-1: Wood fibres thermo-mechanically treated, commercially available under the trade name Woodforce® Natural FAST (Sonae Industria).

Component B-2: Wood fibres thermo-mechanically treated, commercially available under the trade name Woodforce® Black FAST (Sonae Industria).

Component C-1=SMA polymer showing a molecular weight of 110,000, MAH content of 23 wt. %, commercially available under the trade name XIRAN® SZ23110 (Polyscope Polymers).

Component C-2=SMA polymer showing a molecular weight of 120,000, MAH content of 26 wt. %, commercially available under the trade name XIRAN® SZ26120 (Polyscope Polymers).

Component C-3: SMI polymer showing a molecular weight of 145,000, MAH content of 10 wt. %, N-PMI content of 18 wt. %, commercially available under the trade name XIRAN® IZ1018M (Polyscope Polymers).

Component C-4: SMI polymer showing a molecular weight of 150,000, MAH content of 7 wt. %, N-PMI content of 21 wt. %, commercially available under the trade name XIRAN® 0721M (Polyscope Polymers).

Component D: ethylene bis stearamide (EBS).

Component E: Titanium dioxide, commercially available under the trade name TRONOX® CR-470 (Tronox).

Other additives: antioxidants, releasing agents, UV stabilizers, which are already well known to the skilled person.

Comparative example has been prepared according to an analogous process as Examples 1 to 8, but it does not include component E.

Example 9

Mechanical Testing of ABS Thermoplastic Compositions

Thermoplastic compositions according to examples 1-8 were tested performing the following tests:

Tensile Strength test: in accordance with ISO 527-1, -2 standard test, tensile speed of 50 mm/min. Units: MPa.

Izod Notched Impact Strength: according to ISO 180 standard test. Units: KJ/m2.

Vicat B120: according to the ISO 306 standard test; 120° C./h. Units: ° C.

Melt Volume Rate (MVR): according to the ISO 1133-1 standard test; 220° C., 10 Kg. Units: cm$^3$/10'

In Table 2, mechanical properties of the thermoplastic compositions of examples 1-9 are shown:

TABLE 2

| Parameter | Example | | | | | | | | |
|---|---|---|---|---|---|---|---|---|---|
| | 1 | 2 | 3 | 4 | 5 | 6 | 7 | 8 | Comp. |
| Tensile Strength | 51.42 | 47.05 | 49.08 | 49.03 | 48.43 | 50.20 | 52.19 | 46.90 | 50.7 |
| IZOD Impact | 6.5 | 3.7 | 3.8 | 3.6 | 4 | 3.7 | 3.7 | 3.6 | 4.2 |
| VICAT B120 | 100.4 | — | 103.8 | 103.3 | 102.0 | 103.3 | 105.8 | 101.9 | 97.4 |
| MVR | 7.08 | 7.35 | 9.47 | 8.51 | 5.03 | 5.79 | 5.96 | 10.2 | — |

The thermoplastic compositions of examples 1 to 8 showed a good balance between toughness (Izod notched impact >3.5 MPa) and fluidity (MVR, 220° C., 10 Kg, cm$^3$/10'=>5) and tensile strength (about 50 MPa) with stiffness and thermal properties (softening point, Vicat B120 >100° C.). These material compositions are suitable for injection moulding and extrusion process.

When these thermoplastic compositions were extruded/injected, moulded parts showed an excellent surface appearance as shown in the FIGURE, where the composition of Example 2, in part (A) of the FIGURE, and the composition of Comparative example, in part (B) of the FIGURE, were injected. It can be seen that the former shows an excellent surface finishing, whereas the latter shows marks distributed over the entire surface.

The invention claimed is:

1. Thermoplastic composition comprising:
   1) an acrylonitrile-butadiene-styrene (ABS) polymer,
   2) natural fibres,
   3) a compatibilizing polymer, and
   4) processing aids comprising a lubricant and titanium dioxide,
   wherein the amount of titanium dioxide is comprised from 1 to 10 wt. %
   wherein the compatibilizing polymer is a copolymer of styrene and maleic anhydride or a copolymer of styrene maleic anhydride and N-phenylmaleimide.

2. Thermoplastic composition according to claim 1, wherein the amount of ABS polymer is comprised from 40 to 90 wt. %.

3. Thermoplastic composition according to claim 1, wherein the ABS polymer comprises at least one grafted ABS polymer, with a glass transition temperature Tg<0° C.

4. Thermoplastic composition according to claim 3, additionally comprising at least one rubber-free copolymer.

5. Thermoplastic composition according to claim 3, wherein the grafted ABS is obtainable by bulk polymerization process containing at least 50 parts of a grafted vinyl aromatic compound and vinyl cyanide compound in a weight ratio of 90:10 to 50:50, in the presence of from 3 to 50 parts of a butadiene polymer.

6. Thermoplastic composition according to claim 3, wherein the grafted ABS is obtainable by emulsion polymerization process containing at least 25 parts of a grafted vinyl aromatic compound and vinyl cyanide compound in a weight ratio of 90:10 to 50:50, in the presence of not more than 75 parts a butadiene polymer.

7. Thermoplastic composition according to claim 6, wherein the grafted ABS is obtainable by emulsion polymerization process containing at least 40 parts of a grafted vinyl aromatic compound and vinyl cyanide compound in a weight ratio of 90:10 to 50:50, in the presence of at least 50 parts of a butadiene polymer.

8. Thermoplastic composition according to claim 4, wherein the rubber-free copolymer is comprised of styrene and acrylonitrile in a weight ratio of from 90:10 to 50:50.

9. Thermoplastic composition according to claim 1, wherein the natural fibres are cellulose based natural fibres or wood fibres.

10. Thermoplastic composition according to claim 1, wherein the lubricant is selected from the group consisting of stearates, paraffin oils, polyethylene waxes, lauric acid, palmitic acid, stearic acid, stearic acid amides, ethylenediamine, glycerol, and mixtures thereof.

11. Thermoplastic composition according to claim 1, further comprising antioxidants, antistatic agents, mould releasing agents, colorants, pigments, mineral fillers, visible light and UV stabilizers, and mixtures thereof.

12. A moulded article prepared from the thermoplastic composition of claim 1.

13. A method of manufacturing an article comprising using the thermoplastic composition of claim 1 in extrusion, injection, compression moulding or 3D printing.

* * * * *